United States Patent [19]
Engelke et al.

[11] Patent Number: 5,974,116
[45] Date of Patent: Oct. 26, 1999

[54] PERSONAL INTERPRETER

[75] Inventors: Robert M. Engelke, Madison; Kevin Colwell, Middleton, both of Wis.

[73] Assignee: Ultratec, Inc., Madison, Wis.

[21] Appl. No.: 09/108,790

[22] Filed: Jul. 2, 1998

[51] Int. Cl.⁶ .................................................. H04M 11/00
[52] U.S. Cl. ...................... 379/52; 379/93.18; 379/93.28
[58] Field of Search ....................... 379/52, 93.17–93.19, 379/93.25–93.28, 93.14, 93.15; 340/825.19; 455/556

[56] References Cited

U.S. PATENT DOCUMENTS

| | | | |
|---|---|---|---|
| 3,507,997 | 4/1970 | Weitbrect | 178/66 |
| 3,896,267 | 7/1975 | Sachs et al. | 179/2 |
| 4,268,721 | 5/1981 | Nielson et al. | 379/52 |
| 4,451,701 | 5/1984 | Bendig | 179/2 |
| 4,959,847 | 9/1990 | Engelke et al. | 375/121 |
| 5,081,673 | 1/1992 | Engelke et al. | 379/98 |
| 5,091,906 | 2/1992 | Reed et al. | 370/94.1 |
| 5,134,633 | 7/1992 | Werner | 375/38 |
| 5,163,081 | 11/1992 | Wycherley et al. | 379/52 |
| 5,327,479 | 7/1994 | Engelke et al. | 379/52 |
| 5,351,288 | 1/1992 | Engelke et al. | 379/98 |
| 5,432,837 | 7/1995 | Engelke et al. | 379/52 |
| 5,517,548 | 5/1996 | Engelk et al. | 379/52 |
| 5,724,405 | 3/1998 | Engelke et al. | 379/52 |

*Primary Examiner*—Wing F. Chan
*Attorney, Agent, or Firm*—Quarles & Brady LLP

[57] ABSTRACT

An electronic personal interpreter is provided so that deaf or hard of hearing persons can use on-the spot interpreting to converse with hearing persons who do not know sign language. The personal interpreter uses a telephone connection to a telephone relay system for the deaf to perform the actual interpretation. By using a wireless telephone connection, the device is made portable and by using improved communication protocols and a fast translation technique at the relay, conversation-like speeds of information interchange can occur. Thus for the first time, deaf people will be free to move in hearing society and engage in normal speed conversations with hearing people without special adaptations or training by the hearing people.

18 Claims, 2 Drawing Sheets

PERSONAL INTERPRETER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to the general field of telephone communications. In more particular, the invention relates to systems to assist communications between people who are deaf, hard of hearing, or otherwise have impaired hearing capability and people of normal hearing who conventionally communicate by verbal speech.

Most modern human communications in both social and business environments takes place through sound communications. Yet within modern society there are many people who are deaf or who have attenuated hearing capability. The deaf often communicate to each other in a visual language known as American Sign Language, but the capability to communicate in this language is not widespread among hearing people. Thus, the deaf are often reduced to simplified sign language, reading lips, or to writing notes in order to communicate with hearing people out in society.

To assist those persons in making use of the telephonic communication system built for the hearing majority, there has been developed a system of telephone communication which has been principally used by the deaf community. That system makes use of a category of device known variously as a telecommunication device for the deaf (TDD), text telephone (TT) or teletype (TTY). Current TDDs are electronic devices consisting of a key board and a display as well as a specific type of modem, to acoustically or directly couple to the telephone line. Modern TDDs permit the user to type characters into their keyboard, with the character strings then encoded and transmitted over the telephone line to be displayed on the display of a communicating or remote TDD device.

Most TDD communication is conducted in an idiosyncratic code specific to the community of TDD users. This code, known as Baudot, evolved historically at a time when many telecommunication devices for the deaf were based on mechanical or electromechanical devices rather than the current technology using digital electronic components. Accordingly, the Baudot protocol was constructed for a set of constraints which are no longer relevant to present date devices. The original Baudot protocol was a unidirectional or simplex system of communication conducted at 45.45 Baud. The conventional Baudot character set was a character set consisting of 5 bit characters and the system encodes the bits of those characters in a two-tonal system based on carrier tones of 1400 and 1800 Hertz.

The system of TDD communications is widely used and in fact has become indispensable to the deaf community throughout the industrialized world. Deaf persons extensively communicate with their neighbors and with other deaf and hearing people remotely, using the TDD system. In addition, systems have been developed to facilitate the exchange of communication between the deaf community and hearing users who do not have access to or utilize a TDD device. In the United States, telephone companies have set up a service referred to as a "relay." A relay, as the term is used herein, refers to a system of voice to TDD communication in which an operator, referred to as a "call assistant," serves as a human intermediary between a hearing user and a deaf person. Normally the call assistant wears a headset that communicates by voice with the hearing user and also has access to a TDD device which can communicate to the deaf user using a TDD appropriate protocol. In normal relay operations in the prior art, the call assistant types at a TDD keyboard the words which are voiced to her by the hearing user and then voices to the hearing user the words that the call assistant sees upon the display of his or her TDD. The call assistant serves, in essence, as an interpreting intermediary between the deaf person and the hearing person to translate between voice and digital electronic forms of communication.

A limitation in the effectiveness of current relay protocols is the necessity for the call assistant simply to type what is said. Typical call assistants can usually type reasonably well, typically in the range of 30 to 60 words per minute. While systems exist which permit the digital encoding of verbal communications at a faster rate, such as court stenography used in the legal system, such systems require extensive special training and are impractical for the numerous call assistants required by the relay systems in operation today. This limitation on the speed of conversion from speech to digital communications hampers the effective flow of communication in a relay call between the hearing person and a deaf person, since most hearing people speak at a rate which is higher than most call assistants can type. In addition, since conventional Baudot communications is unidirectional, the flow of conversation in a relay assisted communication session can be somewhat awkward. For example, first the hearing person must voice a statement or question. Then the calling assistant must type that statement or question, which is then transmitted at Baudot speeds, which are slower than normal human voice communication, to the deaf person. The deaf person waits until the entire statement or question is transmitted to him or her, after which he or she composes a response and types it in at his or her TDD. Then the communication flows backward to the call assistant who must voice to the hearing person what the deaf person has typed at his or her terminal. This process enables a degree of two-way communication between a deaf person and a hearing person, but the system tries the patience of both parties, since it is typically not conducted at a pace anywhere close to normal human communications.

Typically, in the past, the relay capability has been used solely for telephonic communications.

BRIEF SUMMARY OF THE INVENTION

The present invention is summarized in that a device is designed to use the relay function to enable the use of a truly portable real time interpreter or captioner for the deaf so that deaf and hard of hearing people can move autonomously in hearing society and communicate with hearing people without the hearing people needing special skills or adaptation. The personal interpreter is preferably a portable telephonic device capable of picking up the voice of a hearing person and transmitting it by telephone connection to a relay, and is further capable of receiving the text interpreted version of the hearing person's speech back from the relay by telephone and displaying that text by visual display to the deaf person.

It is feature of the present invention that the use of the personal interpreter is facilitated by a relay system which can operate in a very near to real time fashion to deliver text to the personal interpreter at such a speed that the deaf person can engage in conversations with hearing people at very close to conversational speeds.

It is another advantage of the present invention in that the personal interpreter can utilize a cellular or other wireless telephone connection to communicate with the relay to permit the personal interpreter to be truly portable and capable of use virtually anywhere.

It is an object of the present invention to provide a new level of freedom and convenience to deaf people in communicating with hearing people in a truly portable and conversation like manner.

Other objects, advantages and features of the present invention will become apparent from the following specification when taken in conjunction with the accompanying drawings.

DETAILED DESCRIPTION OF THE INVENTION

The present invention is directed toward a new category of electronic device to permit communication between hearing people and deaf people. The concept is of a small, hand-held or portable appliance that can be carried by the deaf person. The device includes audio pick-up and a speaker, a display and a small keyboard and includes a telephone function. While people may have predicted that a truly portable electronic interpreter might be available someday, the current state of the art in electronic miniaturization and voice recognition does not yet permit the design of a totally integrated and self-sufficient portable interpreter. Thus the key to making this truly portable device available with current technology is to base the operation of this device on the presently available relay system to provide the actual voice to text conversion. By using the relay system, the personal interpreter can provide effective and accurate voice to text interpretation for the deaf user with, to all outward appearances, a totally portable and small device. To facilitate the speed of the communication to approach the speed of normal hearing conversations, an improved form of relay operation is preferred, as will be discussed below.

Figures 1, 2:
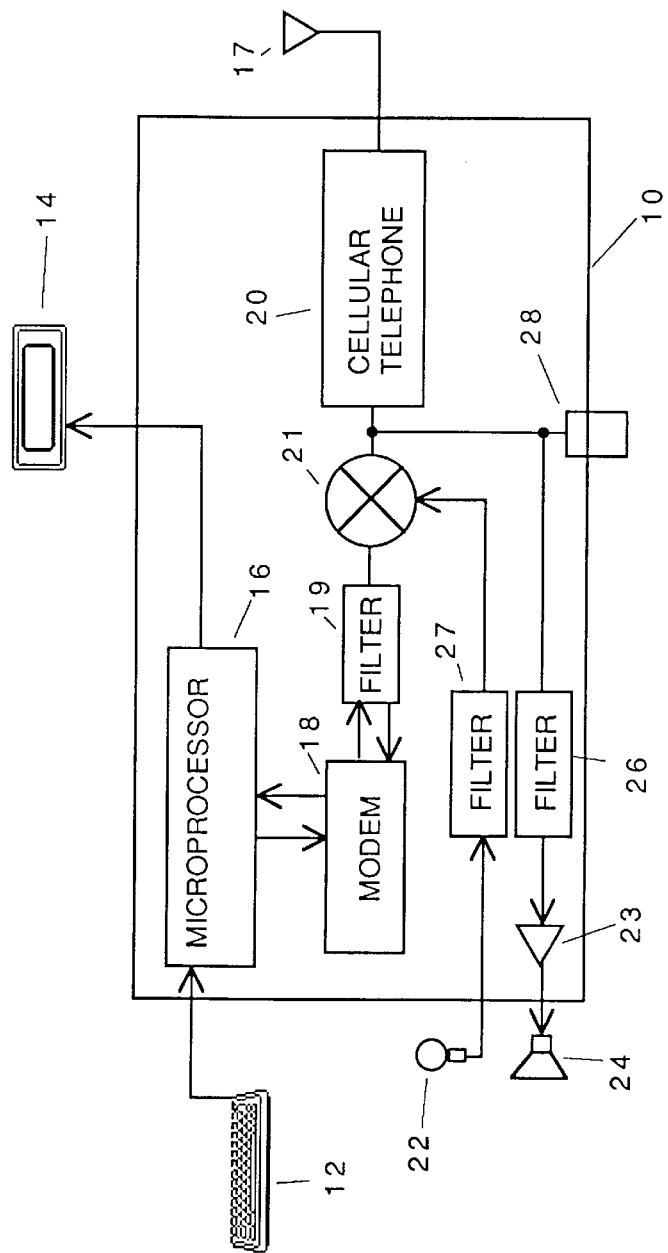
FIG. 1 is an exterior view of a personal interpreter constructed in accordance with the present invention.
FIG. 2 is a schematic block diagram of the personal interpreter of FIG. 1.

Shown in FIG. 1 is an illustration of what a personal interpreter 10 can look like. This would be a small, self-contained, portable hand held device typically the size of a hardbound book. It would have a keyboard of minimal size, but useable by a deaf person who can type. It would preferably have a two to four line display, but could have any size of display which could fit within the case of the device. The device would also typically have a key or switch which would initiate its operation.

Shown in FIG. 2 is a schematic block diagram of the internal electronics of the personal interpreter 10. The personal interpreter keyboard is shown at 12 and its display is shown at 14. The controller for the operation of the personal interpreter is a microprocessor shown at 16. Not shown, but included within the personal interpreter, would be the appropriate memory, RAM and/or ROM, and interface devices so as to allow the microprocessor to be programmed to perform in a predetermined manner of operation and to control the other components of the personal interpreter to perform their functions, in a manner well known in the art. Also inside of the personal interpreter is a modem 18. The modem 18 is preferably a modem specifically designed for interface with the deaf telecommunications system using a Baudot type code and is preferably of the type which makes use of the enhanced form of Baudot communication known as "Turbo Code" (Ultratec), which is generally described in U.S. Pat. Nos. 5,432,837, 5,517,548, and 5,327,479, the disclosure of which is hereby incorporated by reference. The modem also preferably operates in a variant of the Turbo Code which uses a higher carrier frequency, in the range of 2800 to 3500 Hertz, and a faster baud rate, over 100 baud. The modem can use fixed frequencies or, as some modems now do, the modem can communicate with a counterpart to selected suitable high frequencies in the range of 2800–3500 Hertz. The output of the modem 18 is wired through a filter 19 and a mixer 21 to both to a cellular telephone 20 included within the case of the personal interpreter 10, as well as to a conventional land line telephone jack 28 adapted for connection to a land line telephone line. The cellular telephone 20 has a suitable antenna 17 provided on it so that it may dial a cellular telephone network by radio frequency communications of the type normally conducted by cellular telephones. It is to be understood that while the term cellular telephone is used herein, since that is the technology of choice at present, the function served by the cellular telephone 20 is simply a wireless telephone or a wireless connection to the telephone network, and this can be accomplished using other available wireless systems such as the PCS system or radiotelephones. The personal interpreter also includes a microphone 22 and a speaker 24. The microphone 22 and the speaker 24 are of the type that are intended to pick up or transmit sound signals respectively to the room at large in which the device is placed and particularly to and from a speaker addressing the user of the personal interpreter. A filter 26 connects the speaker 24 to output of the cellular telephone 20 or the phone jack 28. A filter 27 connects the microphone 22 to the mixer 21. The filter 26 is either a band-pass or a low-pass filter, as appropriate, to filter out the digital communication frequencies of the modem from the signal to the speaker so that the human listeners in the presence of the personal interpreter 10 are not exposed to the sounds of the digital communication signals. If the digital communication frequencies used by the modem are the Baudot frequencies of 1400 and 1800 Hertz, then the filter 26 should include narrow band-pass filters which exclude only those frequencies. If the communication frequencies are the preferred higher frequencies between 2800 and 3500 Hertz, then the filter can be a low-pass filter which simply filters out frequencies above the lowest frequency used. If the communication frequencies are ASCII or CCITT standards, then the filter 26 is adapted to filter those tones out. The filter 27 is the complement of the filter 26, passing through all frequencies except the digital communications frequencies, so that the electronics will not confuse any elements of the spoken word with digital communications. In the case of such frequency division of the voice and text signals, the voice is preferably allocated to the lower frequency band of the division with the text allocated to the upper band of the division which may be of a bandwidth of only a few hundred Hertz.

It is also envisioned that the functionality of all of the filters 19, 26, and 27 can be implemented by a digital signal processing chip or chip set. In that event, the filtering is actually performed by digital subtraction of the waveforms or frequencies to be filtered. Other formats, including SVD (simultaneous voice and data) such as ITU protocols V.61 and V.70 may also be used. As an alternative, both the voice and text may be digitized and the digital signals combined and separated, using digital combination and filtering respectively, both well known in the art, so as to use a single telephone "line". Although use of a single telephone line is preferred, it will be understood to that two distinct telephone lines may also be used with one dedicated to each of the voice and text signals.

The personal interpreter requires an initiation key or start button. This can be a separate appropriately labeled button or key or can be an series of keystrokes which are recognized by the microprocessor as the initiation command. Also, the personal interpreter 10 could have a fold-open case with a built-in switch to initiate operation of the device automatically when the case is opened. Whichever physical form the initiation command takes, upon its actuation the microprocessor 16 uses the modem 18 to dial the telephone, either through the cellular telephone 20 or a land line connected to the jack 28. The microprocessor dials the telephone number of a relay, and then passes on to the relay control codes to instruct the relay to set itself up for the format of interaction required by the personal interpreter. This format requires the relay, contrary to its normal mode of operation, to transmit the digital signals carrying the text message back on the same telephone connection through which it receives the voice of the speaking person. Thus the implementation of the personal interpreter requires that the code permit the transmission of control or set-up information to the relay. The preferred Turbo Code does include such a feature as described in U.S. Pat. No. 5,432,836, referenced above.

Even a brief description of the operation and functionality of the personal interpreter reveals the dramatic improvement in convenience and portability that this device gives to deaf people. A deaf user can take the personal interpreter 10 into an establishment, be it a government office or retail facility, in which there are only hearing persons present. The deaf person would then place the personal interpreter 10 upon a counter or other surface, open it up, and press the initiation key or start button. The microprocessor 16 and modem 18 of the personal interpreter then power up and act in many ways like a normal TDD device operating in a telecommunication standard protocol, such as Turbo code. It should be noted that while Turbo Code is preferred, other code systems such as ASCII and CCITT also permit the transmission of machine control codes to remote terminals. However, there are several differences in the communication session initiated by the personal interpreter. The start or initiation key further causes the microprocessor 16 of the personal interpreter to perform several operations in sequence. The first operation is to activate the cellular telephone (or the land line link) and dial the number of a relay capable of operating in a manner to support the personal interpreter. Obviously, no wired connection is required to a allow the cellular telephone function to establish a telephone connection with the remote relay. In addition, when the relay answers the telephone connection, the microprocessor 18 of the personal interpreter 10 is instructed to provide command codes to the remote relay. These command codes, a feature possible through the use of Turbo Code, permits the personal interpreter to tell the relay that this is a personal interpreter-type relay communication session. There are two specific features of a personal interpreter-type relay session that are different from present relay sessions. The first is that the relay must set itself up so that it receives voice for interpretation and transmit the data stream both on the same telephone line. This is different that the typical relay call where the deaf person and the hearing person are connected over different telephone lines to the relay call assistant. In some instances, two separate telephone lines could be used, but in the usually preferred set-up, only one telephone line is used. The second set-up requirement is that the relay utilize a fast transcription system, such as the one described below, so that the spoken voice words of hearing people can be rapidly translated to text for the deaf person. Without a fast transcription capability, overall conversation-like speed will not be achieved. All of this set-up can happen in the time necessary to initiate the cellular or land-line telephone call, a time period usually in the range of two to twenty seconds. The command codes transmitted to the relay could also include billing information if a particular party is to be billed for the cost of the relay service.

Once the personal interpreter has completed its set-up and established its connection to the relay, the deaf person can use the personal interpreter to translate words spoken by hearing persons in the presence of the personal interpreter into visually readable text. This is done by the personal interpreter 10, at least to the perception of the persons in its presence. In detail, the words spoken by the hearing persons in the presence of the personal interpreter 10 are picked up by the microphone 22. Those words are then transmitted through the telephone link, such as the cellular telephone 20, to the remote relay where the words are received in voice. The relay, operating as will be described below, then immediately transmits back, in enhanced Turbo Code or other code, a digital communication stream which is close to real time interpretation or captioning of the words that were just spoken. The digital data stream is received by the modem 18, and the microprocessor 16 in the personal interpreter 10, and the words encoded in the digital message are then displayed promptly upon the display screen 14 where they can be read by the deaf person. If the deaf person can speak, he or she may then answer the hearing person with a spoken voice, or, the deaf person may alternatively type upon the keyboard 12. If the deaf user types on the keyboard 12, the personal interpreter transmits the typed words by digital communication signals to the relay. The call assistant at the relay then reads the words typed by the deaf user and speaks those same words which are transmitted in voice over the telephone connection to the speaker 22 contained in the personal interpreter which broadcasts them in sound as a voice communication which can be understood by the hearing users. The filter 26 serves to filter out the digital communication frequencies from the sound generated by the speaker 22. The filter 27 prevents the speakers voice tones from interfering with the digital communications. Thus, in essence, the deaf person has a personal interpreter available to him or her at all times of the day or night wherever the deaf person is within the range of the cellular or land line telephone system. Also, because the relay is preferably operating in accordance with the fast translation methodology described below, a very conversation-like feel can occur in the communication session between the deaf user and the hearing persons in the presence of the personal interpreter 10. In order for this communication session to be satisfactory to the hearing users as well as the deaf person, however, the relay must operate exceedingly rapidly. It is, in part, to meet the need for the exceeding rapidity of this conversational style of communication that the relay protocol described below has been designed.

Figure 3:
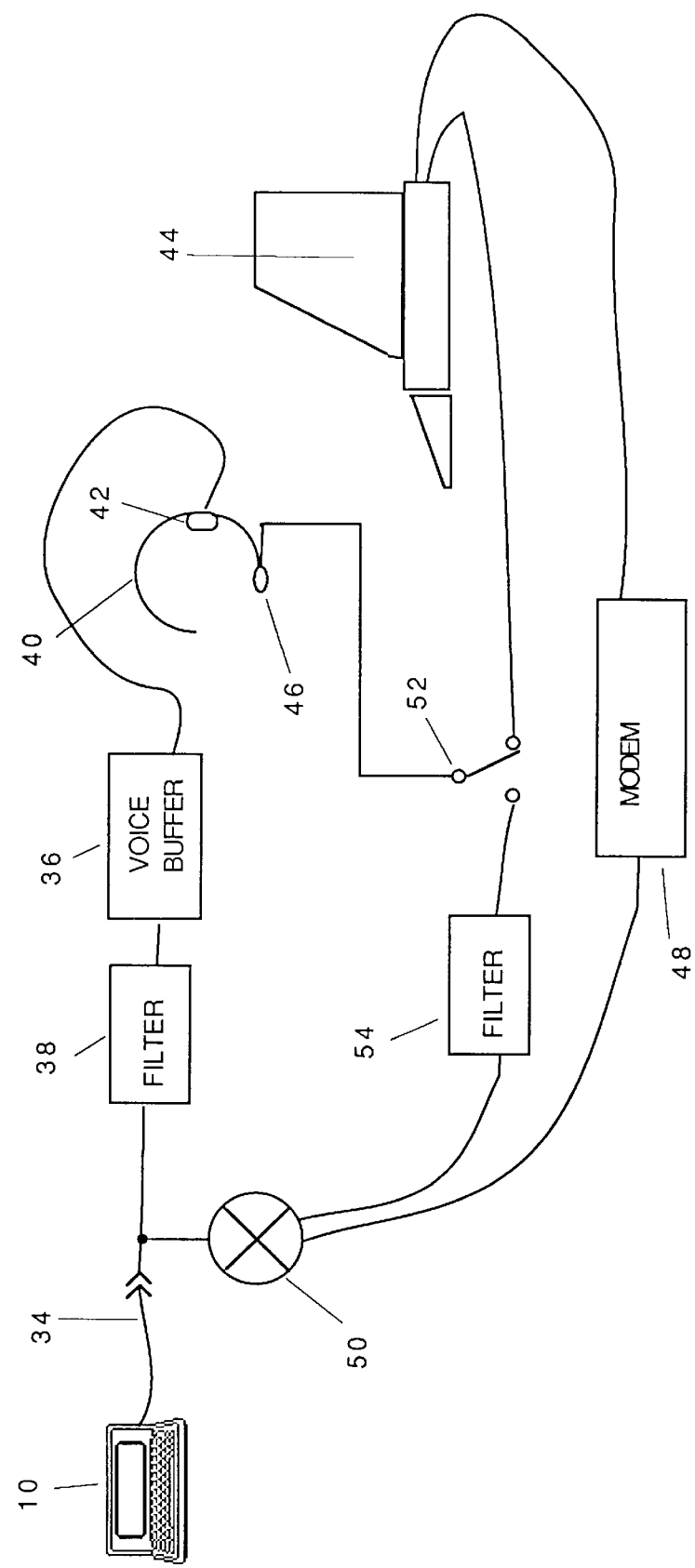
FIG. 3 is a schematic block diagram of a relay to facilitate the personal interpreter of FIG. 1.

Shown in FIG. 3 is a relay intended to provide that capability. FIG. 3 is intended to show, in schematic fashion, how such a relay system can be set up. Shown at 10 is the personal interpreter. The voice input is the microphone 22 of the personal interpreter 10 shown in FIGS. 1 and 2. The personal interpreter 10 is connected through a telephone line 34 to a voice input buffer 36 at the relay. The telephone line 34 can be an actual physical land line, or two separate telephone lines, or can be a cellular or other over-the-air telephone linkage. Between the telephone line 34 and the voice buffer 36 is a filter 38. The filter 38 is designed to filter out any digital communication frequencies on the telephone line 34 from the voice buffer 36 and, like the filter 26 in the interpreter 10, can be either an analog electronic filter or a function performed by a digital signal processing chip. The voice input buffer 36 is a simple buffer to ensure temporary capture of the voice in the event that the call assistant gets behind and needs to buffer or delay the voice of the speaking person. In any event, the output of the voice buffer 36 is provided to a headset 40 where earphones 42 produce the sound of the remote speaking person in the ear of the call assistant. The call assistant is wearing the headset 40 and sitting at a computer 44 capable of communicating in an enhanced Baudot communication, such as Turbo Code, or whatever alternative communication protocol is used. However, contrary to existing practice, the call assistant does not type most of the words which the call assistant hears in his or her earphone 42 into the keyboard. Instead, the call assistant then speaks the words which he or she is hearing in his or her earphones into a microphone 46 in the headset 40. The microphone 46 on the headset 40 is connected to transmit the voice of the call assistant to the computer 44 at which the call assistant sits.

The computer 44 has been provided with a voice recognition software package which can recognize the spoken voice of the call assistant and immediately translate words spoken in that voice into a digital text communication stream. It is a limitation of currently available speech recognition software that the software must be trained or adapted to a particular user before it can accurately transcribe what words the user speaks. Accordingly, it is envisioned here that the call assistant operates at a computer terminal which contains a copy of a voice recognition software package which is specifically trained to the voice of that particular call assistant. It is also important that the voice recognition system be capable of transcribing the words of the voice of the call assistant at the speed of a normal human communication. It has been found that a recently available commercial voice recognition package from IBM known as "Via Voice Gold" will accomplish this objective and which will translate to digital text spoken words of a user at the normal speeds of human communication in conversation when operating on conventional modern personal computers. Other commercially available voice recognition packages such as that from Dragon Systems, known as "Naturally Speaking", may also be employed.

The computer terminal 44 of the call assistant then translates the text created by the voice recognition software to a modem 48 out through a mixer 50 to the telephone line 34 back to the display in the personal interpreter.

For reasons that will become apparent, there is also a connection from the microphone 46 of the headset 40 of the call assistant to the incoming telephone line 34 through a switch 52. The switch 52 can physically be an electrical switch located between the microphone 46 and the telephone line 34 and the computer 44 or, as an alternative, it can be a software switch operating in the computer 44 which passes the voice of the user through to the telephone lines as voice or not under conditions which are selected by the call assistant, by choices he or she makes at the keyboard of the computer 44 or by other means such as voice commands or foot switches. In one preferred embodiment, the switch 52 is a simple single pole dual throw switch although, of course, if this function is performed by the computer it will be a logical not a physical switch. In the simplest embodiment, the switch 52 is a single pole double throw foot switch readily accessible to the call assistant which passes the voice of the call assistant from the microphone 46 either onto the telephone line 34 or to the computer 44. The filter 54 is designed to filter out voice tones in the frequency range of the digital frequencies, similar to the filter 27.

It is a further enhancement to the operation of the relay constructed in accordance with the present invention that the earphones 42 be noise canceling earphones. Noise canceling earphones are commercially available today or, for this purpose, the computer 44 can be provided with noise canceling sound generation software which would create sound impressed to the earphone 42 so as to cancel the sounds of the call assistant's own voice. The noise cancellation avoids distracting the call assistant, since he or she would then be less able to hear the words that he or she has spoken, and thus would be less likely to be distracted from the concentration of the task of revoicing the sounds of the voice heard in the call assistant's ear.

Similarly, another option which would be advantageous is that the software providing for the creation of the text string by voice recognition be buffered in its output flow to the modem 48. Before the computer 44 would pass the data on to the modem 48, the data would first be displayed on the computer screen of the computer 44 for review by the call assistant. The purpose of this option would be to permit the call assistant to use the keyboard to spell or correct hard-to-spell words, or to create corrections of any misinterpretations created by the voice recognition software, from the words spoken by the call assistant. It is anticipated that if such an option is utilized, it would require fairly infrequent use of the keyboard by the call assistant, since frequent use would clearly slow down the through-put of the communications.

The relay of FIG. 3 can operate with normal TDDs but is specifically adapted to support the personal interpreter as shown in FIGS. 1 and 2. It should be understood that although the relay operation is illustrated in FIG. 3 with one telephone line, since that is the preferred version, for a personal communication session it is possible that two telephone lines could be used between the personal interpreter and the relay. The hearing person speaks in the microphone 22 in the personal interpreter 10. The words are transmitted through the single telephone line 34 to the voice buffer 36. The voice buffer 36, again operating under the control of the call assistant, would buffer the voice signals from the hearing user as needed for the call assistant to keep up. The call assistant would hear the voice of the hearing user through the earpiece 42 and then would revoice those same words into the microphone 46. The words that the user speaks into the microphone 46 would be fed to the computer 44 where the voice recognition software, trained to the voice of the call assistant, would translate those words into a digital text stream. The digital text stream would be turned into a digital communication stream by the modem 48 and passed on the single telephone line to the display 14 of FIG. 2. The words are then read by the deaf user. Experience has shown that using currently available technology, the delay between the time the hearing user speaks into the microphone 22 and the time the words appear on the display 14 of the deaf or hard of hearing user is a modest number of seconds. The user is thus receiving near to real time or simultaneous voice to text translation or captioning.

In the reverse, when the deaf user types onto his or her telecommunication device, the digital signals are transmitted to the computer 44 which displays them for the call assistant who then voices those words into the microphone 46 which words are then transmitted onto the telephone line 34. Note that the presence of the switch 52 is therefore important in this mode. Since the voice of the call assistant serves two different functions in the operation of this system, the signal on the call assistant's voice must be switched so that the hearing user only hears the voice for the communications which are intended to be directed to that person. The switch 52 allows for the voice of the call assistant only to be directed to the hearing person at the appropriate times. This switching function could also be performed by voice commands or automatically upon detection of text flow from the personal interpreter to the relay.

Note again that if the relay of FIG. 3 is used to facilitate a translation based on a personal interpreter such as that shown in FIGS. 1 and 2, there will be only one telephone line between the personal interpreter and the call assistant. There would be only one telephone line, a cellular link, land-line or other telephone connection between the personal interpreter and the call assistant. Note therefore that the voice of the call assistant and the digital communications created by the computer 44 must travel on that same telephone line to and from the personal interpreter 10. It is therefore important that the personal interpreter 10 and the relay each have appropriate filtering (i.e. the filters 26 and 27) to filter out the digital communication frequencies of the digital communications so that they are not heard by hearing listeners, such as other people in the presence of the personal interpreter 10. The telephone line must still carry voice signals, however, so that the spoken words articulated by the call assistant in response to digital instructions from the deaf user can be properly broadcast by the speaker contained within the personal interpreter.

The provision for filtering of the digital frequencies can be done in any number of ways with two being the principal preferred methodologies. If turbo Baudot communications are conducted at the conventional Baudot frequencies of 1400 and 1800 Hertz, the personal interpreter 10 could be provided with notch filters 26 to filter out signals at those particular frequencies. It has been found that such notch filters still permit the transmission of audible and understandable human speech, even if they filter at those particular frequencies. As an alternative, it is possible to change the Baudot frequencies to those which are higher, such as frequencies over 2800 $H_z$, without preventing comprehension of the human voice. If this alternative is implemented, the personal interpreter 10 is then provided with a low pass filter which permits low frequency sounds to go to the speaker to be broadcast into the environment of the personal interpreter, while high frequencies are excluded.

It has been found in actual human tests that utilizing the revoicing methodology combined with speech recognition by the call assistant results in a through-put of communication two to four times faster than the typing which can be achieved by a normal call assistant operating a keyboard. This is a dramatic improvement in the social acceptability of deaf to hearing person translation systems. While deaf users are accustomed to the delays inherent in TDD communications, hearing users are not. The provision for the faster throughput through a relay system such as provided by the relay of FIG. 3 allows for more conversation-like interchange between deaf persons and hearing persons than was heretofore possible.

The relay of FIG. 3 also enables, for the first time, a personal interpreter of the type illustrated at 10 in FIGS. 1 and 2, and that device offers to deaf users the ability to obtain on the spot interpreting virtually anywhere, any time. This offers a freedom to move and interact in hearing society to deaf users which was not heretofore possible in the art. Since the cost of relay operations in the U.S. is supported by state organizations which are supported in turn by tolls on the telephone systems, the user pays nothing for the use of the relay. Thus the cost to the user of this device is simply the purchase cost of the personal interpreter plus the cost of cellular telephone service, a modest expense for the dramatic performance provided.

It is to be understood that the present invention is not limited to the particular illustrations and embodiments disclosed above, but embraces all such modified forms thereof as come within the scope of the following claims.

We claim:

1. A digital electronic personal interpreter device adapted to use a telephone relay service, the digital electronic personal interpreter device comprising:

a microphone allowing the reception of a voice of a person speaking to a user of the digital electronic personal interpreter device;

microprocessor;

a modem;

a visual display readable by the user of the digital electronic personal interpreter device; and a telephone connection which can connect to the relay;

the microphone connected so that the voice picked up is transmitted to the relay;

the modem connected to receive digital text communications representing a transcription of the voice from the relay over the telephone connection and to transmit that text to the microprocessor; and the microprocessor connected to display the words of the text communications received through the modem on the display.

2. A digital electronic personal interpreter device as claimed in claim 1 wherein the telephone connection includes a wireless telephone.

3. A digital electronic personal interpreter device as claimed in claim 2 wherein the wireless telephone is a cellular telephone.

4. A digital electronic personal interpreter device as claimed in claim 1 wherein the digital electronic personal interpreter device also includes a speaker connected to the telephone connection to create audible voice in the presence of the person speaking to the user if voice signals are received over the telephone from the relay and a filter connected between the telephone connection and the speaker to prevent digital communication frequencies from being broadcast on the speaker.

5. A digital electronic personal interpreter device as claimed in claim 1 wherein the telephone connection is one telephone line and the voice and digital text share the one telephone line.

6. A digital electronic personal interpreter device as claimed in claim 5 wherein a bandwidth of the one telephone line is divided into frequency portions with the voice using the portion of lower frequency and the digital text using the portion of higher frequency.

7. A digital electronic personal interpreter device as claimed in claim 5 wherein the voice and digital text are sampled and digitized and the digitized samples combined for transmission on the one telephone line.

8. A digital electronic personal interpreter device as claimed in claim 1 wherein the telephone connection is two telephone lines, one for the voice and one for the digital text.

9. A digital electronic personal interpreter device adapted to interpret between a deaf or hard of hearing person and a hearing person using the services of a telephone relay, the digital electronic personal interpreter device comprising:

a microphone;

a telephone;

a microprocessor controlling the operation of the components of the digital electronic personal interpreter device;

a modem connected between the microprocessor and the telephone;

a visually perceptible display connected to be under the control of the microprocessor; and a user operable initiation switch, the operation of the user operable initiation switch causing the microprocessor to control the telephone to initiate a telephone connection to the relay and to send command codes to the relay to cause the relay to receive voice over the telephone and transmit digital text translated from that voice communication back to the digital electronic personal interpreter device over the same telephone connection so that the microprocessor can display the digital text interpretation of the voice communication on the display.

10. A digital electronic personal interpreter device as claimed in claim 9 wherein the telephone is a cellular telephone.

11. A digital electronic personal interpreter device as claimed in claim 9 wherein the interpreter also includes a speaker connected to the telephone to create audible voice in the presence of the interpreter if voice signals are received over the telephone from the relay and a filter connected between the telephone and the speaker to prevent digital communication frequencies from being broadcast on the speaker.

12. A digital electronic personal interpreter device adapted to interpret communications between a hearing person and a deaf or hard of hearing person using the services of a telephone relay, the digital electronic personal interpreter device comprising:

a microphone;

a speaker;

a telephone connected to the microphone and to the speaker so as to be capable of transmitting voice received by the microphone to the relay and of transmitting voice received from the relay to the speaker;

a modem connected to the telephone to decipher the text from any digital communication signals received by the telephone;

a microprocessor connected to the modem to receive and store any text deciphered by the modem;

a visually readable display connected to be controlled by the microprocessor and used by the microprocessor to display the words of the text received by the microprocessor; and a filter connected in between the speaker and the telephone so that digital communication signals used by the modem are filtered from the signal transmitted to the speaker so that person listening to voice transmitted by the speaker do not hear the digital communication signals.

13. A digital electronic personal interpreter device as claimed in claim 12 wherein the digital communication frequencies used are substantially at and above 2800 Hertz and the filter is a low pass filter.

14. A digital electronic personal interpreter device as claimed in claim 12 wherein the digital communication frequencies used are 1400 and 1800 Hertz and the filter includes notch filters for the digital communication frequencies.

15. A digital electronic personal interpreter device as claimed in claim 12 further including a initiation key the actuation of which by the user causes the microprocessor to use the mode to dial the relay and to transmit command codes to the relay instructing the relay to send the translated text from the voice signal back to the digital electronic personal interpreter device over the wireless telephone.

16. A hand held digital electronic personal interpreter device to caption communications between a hearing person and a deaf or hard of hearing person using the services of a telephone relay, the digital electronic personal interpreter device comprising:

a microphone;

a wireless telephone connected to the microphone so as to be capable of transmitting voice received by the microphone to the relay;

a modem connected to the telephone to decipher the text from any digital communication signals received from the relay through the telephone;

a microprocessor connected to the modem to receive and store any text deciphered by the modem;

a visually readable display connected to be controlled by the microprocessor and used by the microprocessor to display the words of the text received by the microprocessor; and a filter connected between the microphone and the telephone so that frequency components of voice picked up by the microphone are filtered out of the voice signal transmitted over the telephone.

17. A digital electronic personal interpreter device as claimed in claim 16 further comprising a speaker connected through a filter to the telephone, the speaker serving to broadcast voice received by the telephone, the filter designed to filter out digital communication frequencies from the filter.

18. A method of providing portable near-to-real-time voice to text captioning for a deaf or hard of hearing user, the method comprising:

providing the user with a hand held digital electronic personal interpreter device including a microphone, a display, a modem, and a telephone, initiating operation of the hand held digital electronic personal interpreter device in the presence of a speaking person;

transmitting voice of the speaking person spoken in the presence of the hand held digital electronic personal interpreter device from the microphone over the telephone to the relay, and at the relay, translating the received voice to a digital text message and transmitting the message back over the same connection to the telephone; and at the hand held digital electronic personal interpreter device, the modem deciphering the text message which is received by the microprocessor and displayed on the display so that the user receives a near-to-real time text version of the words spoken by the hearing person.

* * * * *